United States Patent

[11] 3,618,913

| [72] | Inventor | Arno Schramm<br>Mannheim, Germany |
|---|---|---|
| [21] | Appl. No. | 825,233 |
| [22] | Filed | May 16, 1969 |
| [45] | Patented | Nov. 9, 1971 |
| [73] | Assignee | Stahl Apparate-Und Geratebau G.m.b.H.<br>Viernhein am Hessen, Germany |

[54] FRACTIONATING COLUMNS
14 Claims, 11 Drawing Figs.

[52] U.S. Cl. .................................................. 261/114 VT
[51] Int. Cl. .................................................. B01d 3/20
[50] Field of Search ........................................ 261/114 VT

[56] References Cited
UNITED STATES PATENTS

| 3,019,003 | 1/1962 | Glitsch ........................ | 261/114 VT |
| 3,037,754 | 6/1962 | Glitsch ........................ | 261/114 VT |
| 3,080,155 | 3/1963 | Glitsch et al. .................. | 261/114 VT |
| 3,245,669 | 4/1966 | Huggins et al. ................ | 261/114 VT |
| 3,105,862 | 10/1963 | Doering, Jr. .................. | 261/114 VT |
| 3,491,987 | 1/1970 | Eckert .......................... | 261/114 VT |

FOREIGN PATENTS

| 903,739 | 8/1962 | Great Britain ................ | 261/114 VT |
| 1,286,883 | 5/1963 | France ........................ | 261/114 VT |

*Primary Examiner*—Tim R. Miles
*Assistant Examiner*—Steven H. Markowitz
*Attorney*—Pierce, Scheffler & Parker ABSTRACT: An intermediate plate of a fractionating column includes shutters vertically movable in support members, which latter are vertically movable in the bottom apertures of the plate. The support members have openings therein for the passage of the lighter medium.

INVENTOR

Arno SCHRAMM

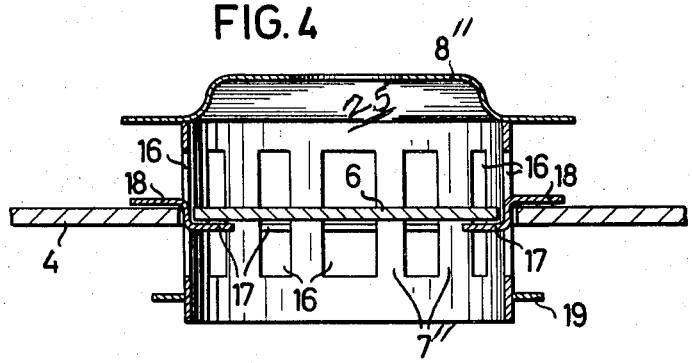
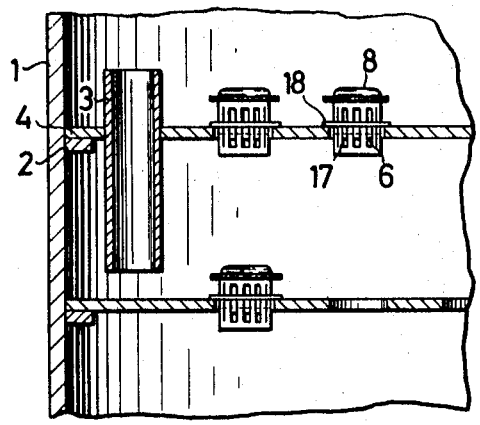
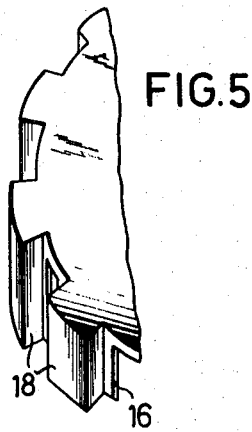
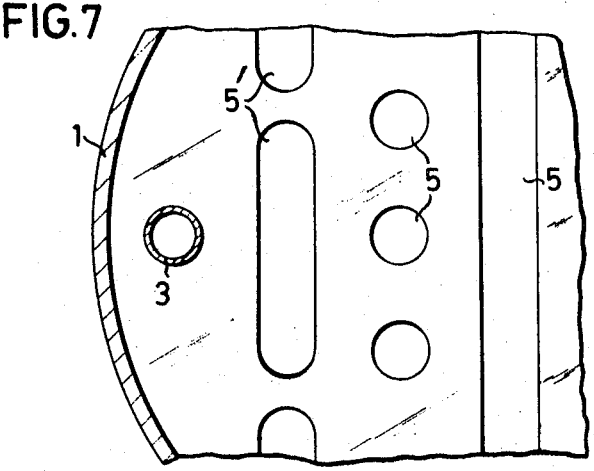
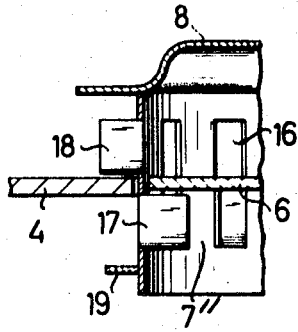
INVENTOR
Arno SCHRAMM

INVENTOR

Arno SCHRAMM

FRACTIONATING COLUMNS

The invention relates to an improved intermediate plate for a material exchange column, e.g., a fractionating column which plate has bottom apertures therein, and consists in that in the improved structure of the present invention the bottom apertures of the plate are covered by shutter members which are guided in holding devices for limited vertical movements, the holding devices themselves being guided by means of guide pieces in the bottom apertures, and the vertical movement of these guide pieces are limited by stops while the holding devices are provided with openings for the passage of a lighter medium.

An embodiment according to the invention provides that the shutter members are smaller than the bottom apertures covered by them, the shutters having a hydrodynamic form, for example, a dome-shaped form the concave side of which faces the approach flow direction of the lighter medium or is arranged remote of it.

According to a modification of the above embodiment of the invention the holding device can consist of a body substantially similar to the form of the bottom aperture, which body extends over the bottom aperture and which has current-guiding extensions, like scallops, lips, etc. the guide pieces with the limiting pieces being molded on the end stop and the limiting pieces being secured or molded on the body to limit the bottom position.

Another embodiment according to the invention provides that the limiting pieces and/or guide pieces are connected to, or molded on, a ring.

It is advantageous in some cases that the holding device be associated with more than two guide pieces, especially if the openings formed between the guide pieces are provided with projections which extend parallel to the direction of flow of the lighter medium traversing the openings on its inlet,—or outlet,—side.

According to another aspect of the invention, two tongues are cut out of the wall of the shutter member which tongues are positioned by bending perpendicularly to the flow section and parallel to the direction of flow of the lighter medium, the wall in which the openings are provided being folded, if necessary, and the openings being provided either in the top fold or in the bottom fold.

In a further embodiment the extensions have different lengths, and/or form an angle to the main direction of flow of the lighter medium, these extensions being also formed, for example, by sleeves inserted into the openings and cut off obliquely, if necessary. According to the invention, such extensions can be arranged underneath the shutter member to the inside,—that is, facing the bottom opening traversed by the lighter medium, and above the shutter member to the outside,—that is, in opposite direction.

The intermediate plate can also be so designed that the bottom apertures have a rectangular form, some or all of the holding devices (forming a bottom) being so mounted that they bear immovably with the limiting pieces on the floor plate.

According to one embodiment of the invention, individual or all holding devices belonging to an intermediate plate have no, or only narrower, lower or less widely spaced openings on the side approached by the heavier medium, than on the opposite side.

Another intermediate plate according to the invention is provided with shutter members which are mounted for rotation about an axis parallel to the bottom aperture, and the opening direction of the shutter members is such that the lighter medium preferably is guided in the direction of flow of the heavier medium. In some cases, it may be of advantage to guide the shutter members by a central guide pin provided with pin stop means.

Another embodiment according to the invention eliminates the shutter members and designs the holding device per se as a shutter member.

Finally, the shutter members and/or holding devices inside a plate or tray mounted in a column have different weights, all parts being produced (if necessary) by casting and/or molding from metal or plastic.

The intermediate plate can be used for fractionating liquid mixtures, for washing gases, as well as for all processes where an intensive contact between gases and vapors with liquids or between liquids and liquids is required, that is, generally for the contact of a lighter and a heavier medium.

Intermediate plates or trays in material exchange columns, so-called perforates plates, are known wherein the bottom apertures have no shutter members, so that with small amounts of the lighter medium, or with amounts varying in operation, the heavier medium can more or less pour through the bottom apertures. In order to prevent this pouring, it heretofore has been suggested to provide openings in vertical walls or gas hoods covering the bottom apertures. This measure is effective only if the apertures are relatively small. The resistance which must be overcome when passing through the small apertures of such device is therefore correspondingly high. Shutter members for the bottom apertures have also been suggested wherein the bottom apertures are designed as valve seats and the shutter members as valve covers which are limited in their movement by holding devices.

Such valve covers are operated by the pressure difference between the underside and topside of the plate or tray. The area operable by the valve cover for the passage of the lighter medium depends, apart from the size of the bottom aperture itself, also on the stroke which the valve cover can perform between its top position and the plate or tray. This stroke normally is rather limited in view of the possibility that the valve cover becomes jammed or slanted on its guiding device. It has been suggested, therefore, to allow the movement of the valve cover to take place in several—preferably two stages—in such manner that the valve cover lifts up a ballast disk after a part of its full stroke; in this way the weight of the valve cover is increased and the swinging movement of the valve cover is limited to the space between the bottom plate and the position of the ballast disk until the differential pressure corresponding to the weight of the valve cover plus ballast disk has been exceeded. Then the valve cover plus ballast disk rises up to the next ballast disk and to the end stop respectively.

The valve cover traverses the entire stroke provided between the bottom plate and the end stop along guide pieces, even in stages, with the risk of jamming at the guide pieces. This partial improvement of the operation of the valve means requires—apart from at least one ballast disk—a holding device with supports and guide pieces whose own weight is not utilized for a ballast effect according to the known state of technology.

An object of the present invention is to divide the stroke of a shutter member over a bottom aperture of an intermediate tray or plate in an exchange column into two relative movements, one of which is performed by the shutter member in a holding device up to an end stop, and the other from the holding device itself with respect to the bottom aperture up to an end stop. The stroke performed by the shutter member and the holding device is only a part of the stroke performed by the entire arrangement to open the bottom aperture. In addition to the weight of the shutter, the weight of the holding device is also utilized for the differentiation of the stroke movement. Apart from the advantage of saving weight and the simplification with respect to the state of technology, the assembly is also facilitated since no special assembly is required for a holding device connected with the bottom plate.

The different ratios of lighter medium to heavier medium occurring in material exchange columns can be taken into account by fixing the holding devices in their top or bottom position on corresponding bottoms or within a bottom, so that one of the two relative movements is selectively eliminated. Fixing in the bottom position reduces the stroke and takes into account a small throughput of the lighter medium. Fixing in the top position makes it possible to handle a larger amount of the overflowing heavy medium and the resulting gradient, by introducing the lighter medium in a directional manner into the heavier medium. To this end the shutter members are mounted for rotation about axes extending perpendicularly to the direction of flow of the heavier medium overflowing the bottom. It is also possible to use several rotatably mounted shutter members for one bottom aperture, as well as to combine rotatably and vertically guided shutter members with each other as a shutter assembly.

The device according to the invention can also be adapted easily to the varying conditions occuring in the industry insofar as the shutter members can be eliminated and the holding device alone made to perform the regulating function. Such a measure can be of advantage in a material exchange column if a relatively large initial opening, for example, to obviate the danger of fouling, is desired.

Finally, due to the fine regulating effect of the device according to the invention, a part of the bottom area can be equipped with other devices having a less pronounced regulating effect. Thus, for example, a good working characteristic of the intermediate trays is obtained if the latter are designed partly as a perforated plate and equipped partly with the devices according to the invention. The devices according to the invention can also be interchanged in any desirable manner.

The invention will now be described in greater particularity and in connection with the accompanying drawings in which:

FIG. 4 is a cross section of a body represented in FIG. 1 for closing the bottom apertures according to a different embodiment;

FIG. 5 is a perspective view of a part of the wall of the cylindrical part of the holding device according to FIG. 4 in a modified embodiment;

FIG. 6 is a vertical sectional view through a part of a material exchange column with two superposed intermediate trays, as in FIG. 1 but with modified devices above and in the bottom apertures respectively;

FIG. 7 is a partial top plan view of the upper intermediate tray shown in FIG. 6 without devices for closing the bottom apertures;

Figure 2:
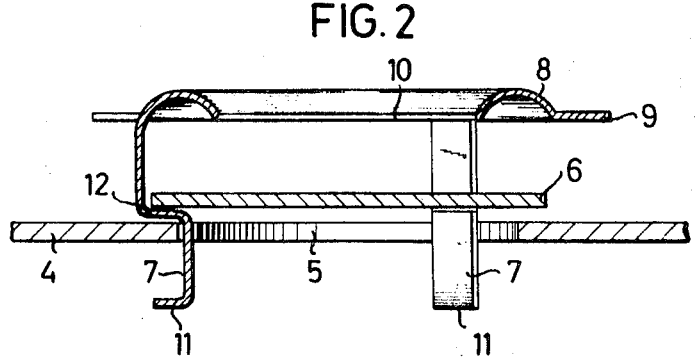
FIG. 2 is a cross section of a part of an intermediate bottom.
Figure 8:
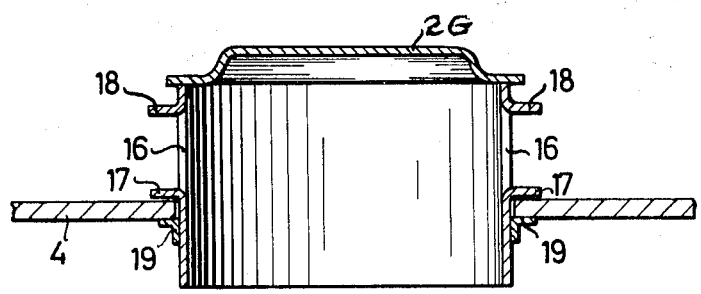
FIG. 8 is a cross-sectional view through a closing device over rectangular bottom apertures.
Figure 9:
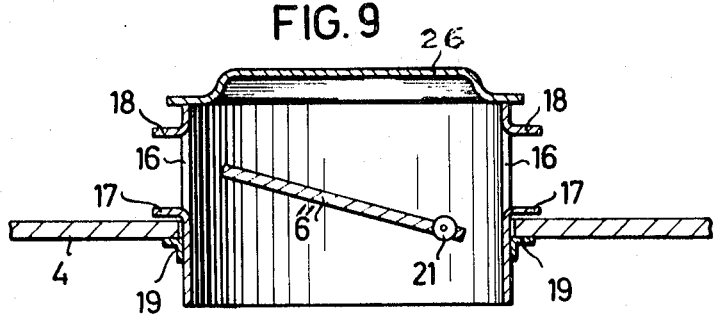
Figure 10:
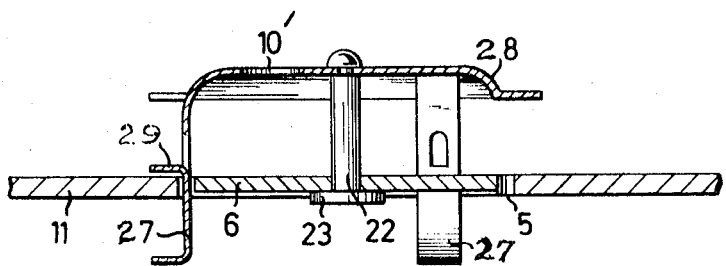

FIG. 9 corresponds to FIG. 8, except that the shutter member of the bottom aperture is mounted eccentrically for rotation for the directional introduction of the lighter medium;

FIG. 10 is a cross-sectional view corresponding substantially to FIG. 2, but with modified guidance and the limitation of the bearings of the shutter member and of the holding device; and FIG. 11 is a partial cross-sectional view of the body represented in FIG. 4, where the extensions are formed by vertical bending edges.

Figure 1:
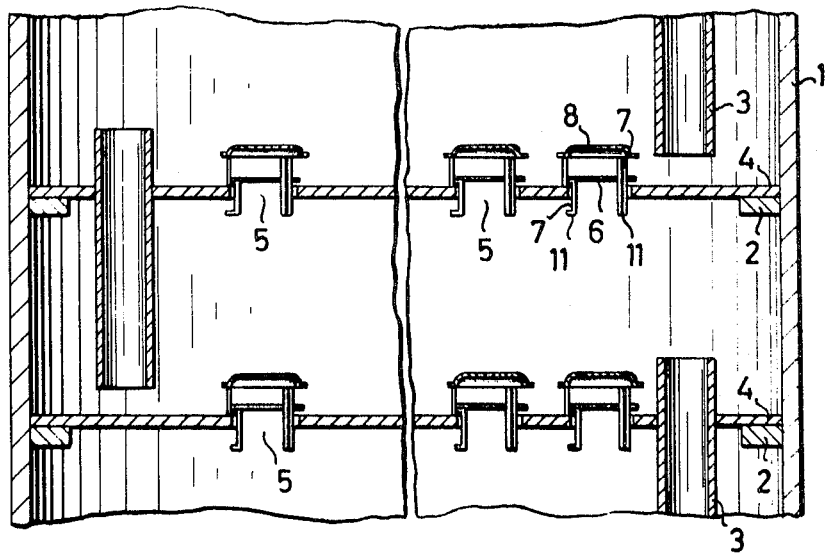
FIG. 1 is a vertical sectional view through a part of a material exchange column with two superposed intermediate bottoms and parts of the down pipes for the heavier medium, as well as other devices associated with the intermediate bottoms.

The material exchange column has, for example, according to FIG. 1, a cylindrical housing 1. The housing can also have any other suitable cross-sectional form and also can be rectangular. Inside this housing there are arranged several intermediate plates or trays 4, of which two are shown in FIG. 1 by way of example.

The intermediate trays are supported in the proximity of the circumferential walls of the housing 1 by means of strips 2. For conveying the heavier medium from one intermediate tray to the other there are provided down pipes 3 which project with one end over the plate of the intermediate tray 4, so that a certain amount of the heavier medium is on the intermediate tray during the operation of the material exchange column. The lower part of the down pipe extends almost to the upper side of the intermediate tray beneath it, namely, so far that this end of the down pipe dips into the heavier medium disposed on the intermediate tray. The lighter medium is conducted, by way of several apertures 5, through the intermediate tray and comes thus in contact with the heavier medium on the floor of the tray. Each aperture is covered by a shutter member 6, which rests loosely on the aperture. The holding device of this shutter member consists of guide pieces 7 and the end stop 8. The holding device is mounted for vertical movement in the bottom aperture.

When the lighter medium passes through the aperture 5, the shutter member 6 is lifted by the pressure difference caused between the upperside and underside of the intermediate tray. When the throughput increases, shutter member 6 bears on end stop 8, and if it increases further, the entire holding device including the shutter member is lifted up to the end stop 11 of the guide pieces, which bear then on the intermediate tray. The cross section through which the lighter medium is fed laterally into the heavier medium is thus differentiated and increased in two stages. If the throughput of the lighter medium is reduced, the device closes in the reverse order.

A detailed embodiment of the shutter above a circular bottom aperture, for example, is shown with its holding device in FIG. 2. The holding device there consists of three guide pieces 7, for example, which are obtained by molding them on the end stop 8 of the holding device. The guide piece, suitably bent, provides a stop 12 bearing against the bottom plate 4, which also guides at the same time the shutter member 6. This stop 12 limits the movement of the entire device in its bottom position, while the top position of the device is limited by stops 11 on the guide pieces 7. The upper end stop 8 is provided with an opening 10 which can be necked out to the inside. By corresponding dimensioning of the opening 10, the entrance and exit of the heavier medium can be controlled. The opening 10 can also be eliminated in some instances. The shutter member 6 can also be made so large that it protrudes over the guide pieces 7, in which case the shutter member is provided with recesses accommodating said guide pieces and which ensure the guidance of the shutter member in the guide pieces. The edge 9 of the end stop 8 has no special hydrodynamic form in this FIG. 2 embodiment. The molding of the guide pieces on the end stop has advantages for the manufacture because the entire device consists merely of two parts. Substantially the holding device consists of a disk with three guide pieces arranged on the outside. A second disk forms the shutter member. In order to save material, the guide pieces can also be punched out from the inside of a disk.

Figure 3:
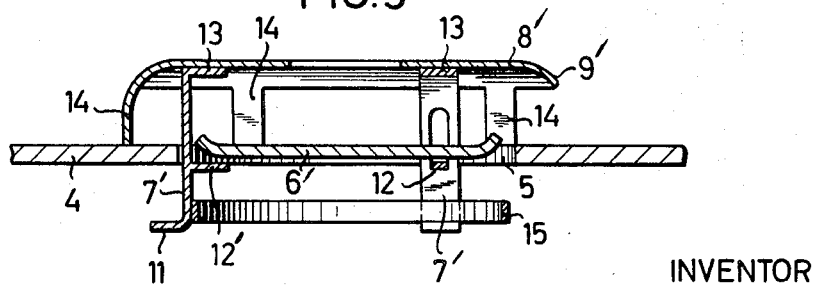
FIG. 3 is a cross section of the body represented in FIG. 2 with a modified design of some parts.

Another example or embodiment is shown in FIG. 3. In this case the circular bottom aperture 5 is covered by a shutter member 6', which is smaller than the bottom aperture itself and which is dome shaped. The dome form can also be obtained by making the shutter member convex-concave and arranging it preferably so that the center of the shutter member protrudes into the bottom aperture. The guidance of the shutter member in the bottom aperture is effected by guide pieces 7' which are welded on the end stop 8', for example, by means of tongues 13 or which can also be secured in any other way.

The guide pieces 7' carry the end stops 11 and 12' which effect the vertical limitations of the shutter member and of the holding device. The bottom position of the device is fixed by the stops 14 which are pieces molded, for example, on the end stop 8'. These stops 14 can also be separately produced parts, and be secured in a suitable manner (e.g., by welding) on the end stop 8'. The stops 14 can also be parts molded on the guide pieces 7, or they can be secured on the latter, by designing, for example, tongues 13 in the direction and position of the stops 13 shown in FIG. 3. The edge 9' of the end stop 8' is here rounded, so that the device is particularly strong.

The details shown in FIGS. 2 and 3 can naturally also be interchanged. Thus, for example, the plan shutter member 6 shown in FIG. 2 could also be used in FIG. 3. The shutter member shown in FIG. 3 could also be arranged with its concave side down. The guide pieces 7' shown as an example in FIG. 3 can be replaced, on the other hand, by guide pieces such as are shown in FIG. 2. Finally, the dome-shaped form of the end stop 8', which is used for example, in FIG. 3, can also be used in FIG. 2. The edge 9' might have recesses or other arrangements advantageous for the distribution of the lighter medium.

In order to ensure greater mechanical stability, the guide pieces 7' can be connected with each other by a ring 15 to which they are secured. The guide pieces 7' can also be molded on a ring. A combination of the upper ends of the guide pieces 7' in FIG. 3 is also possible.

Only three guide pieces have been used in the present embodiments. However, an advantageous embodiment can also be realized if more than three guide pieces form the holding device. We obtain then a lattice which prevents the medium from pouring through by the surface tension of the adjoining heavier medium acting along the edge of the lattice apertures. It was found that this action on the lattice apertures is increased and at the same time the pressure drop, which the current undergoes in the lattice apertures, can be substantially reduced if the lattice apertures are provided with extensions arranged along their edges. These extensions can be obtained, for example, if the apertures are not punched out but rather that two tongues are cut out which by suitable bending form the desired extensions. The extensions at the apertures can be given a particularly effective length by folding the lattice wall in which the apertures are arranged, the apertures being either at the lowest or highest points of the folds. A desired directional introduction of the lighter medium into the heavier medium can be effected by giving the cutout tongues different lengths, or by placing tongues of substantially equal length at an angle to the main direction of flow of the lighter medium. The extensions can also be provided by means of sleeves which are introduced into the apertures. In this case a directional introduction of the lighter medium can be achieved by cutting off the sleeves obliquely, so that their overall length differs in the direction of flow. The extensions can be arranged both at the inlet and at the outlet side.

FIG. 4 shows, in one embodiment, how the device according to the invention can be built by means of lattices whose apertures are provided with extensions. The holding device consists of a cylindrical part 25 which is provided with lattice apertures 16, 16 between which remain the webs 7". This cylindrical part 25 carries an end stop 19 for limiting vertical movement in the top position. In the lower part,—that is, in the part protruding down from the tray in the bottom position of the holding device,—apertures 16 are provided with extensions 17 which protrude into the interior of the body. These extensions 17 form the support and the limitation of the shutter member 6, which is mounted for free movement in the interior of the holding device. The remaining upper part of the openings is provided with extensions 18 which, protruding outwardly, bear on the bottom plate 4 in the bottom position of the holding device. The upper limitation for the vertical movement of the shutter member 6 is the end stop 8", which can be designed as described above and which can be connected in known manner, for example, by welding or by pins, with the cylindrical part 25 of the holding device. The holding device, which contains the shutter member in its interior, is mounted for free movement in the bottom aperture 5. Between the transition from the extensions 17 to the extensions 18 a web can be provided, which web extends as a ring around the entire cylindrical part. The extensions 17 and/or 18 at the apertures 16 can also be arranged vertically, as shown in FIG. 11.

FIG. 5 shows a section of a part of the lattice wall when the latter is folded and the lattice apertures are provided, for example, in the lowest points of the folds.

A simplification of the construction of the intermediate tray can be effected by minor variations in the operating conditions of a material exchange column. In such a case it suffices to equip a part of apertures with the above described two-stage devices, while the rest of the apertures can be equipped with devices which regulate only in one-stage or not at all.

Another simplification of the construction lies in the fact that the part of the apertures which are provided with one-stage or nonregulating devices, can be combined to oblong, preferably rectangular, apertures. A section of a material exchange column which is equipped in this manner with intermediate trays, is shown in FIG. 6. The intermediate trays 4 are secured by means of strips 2 on the circumferential wall of the housing 1. The heavier medium is conducted by means of the fall pipe 3 to the following intermediate tray. The arrangement of the bottom apertures 5 is to be effected, for example, as shown in FIG. 7. One row of rectangular apertures 5' alternates with one row of circular apertures. An embodiment of the device, which belongs to the rectangular apertures, is shown by way of example, in FIG. 6. The device corresponds substantially to the parts already described in connection with FIG. 4, with the difference that these are made rectangular corresponding to the rectangular bottom aperture 5'. This is particularly true for the shutter member 6, and the sidewalls carrying the extensions 17 and 18. The entire holding device is rigidly connected by means of the end stop 19 with plate 4. The rows of circular apertures are equipped with devices which correspond, for example, to the device described in FIG. 4. The intermediate tray operates as follows: Substantially the smallest amount of the lighter medium flows through the rectangular apertures, while the circular apertures remain closed. The circular apertures take over the regulation of the peaks of the throughput. The respective operating conditions can be taken into consideration to a great extent by weight differences of both devices and also by the weight ratio of the shutter member to the holding device. FIGS. 6 and 7 show an alignment of the rows of circular and rectangular apertures perpendicularly to the direction of flow of the heavier medium. An arrangement turned by 90° can also be provided.

A great simplification in the design of the intermediate tray, which is still sufficient, however, in some practical cases, is achieved if the devices above the rectangular apertures have no regulating function. Such a device is shown in FIG. 8. Along the border of the rectangular bottom aperture 5 are arranged walls with openings 16 and extensions 17, 18. These extensions can also be arranged in the manner shown in FIG. 11 with respect to the openings 16. End stops 19 can be used for securing the device in its upper position. The openings lined this way with walls are closed by the end stop 26. For larger quantities of the heavier medium to be put through over the intermediate tray, a gradient is formed in this way, which has the result that a greater height of charge is formed in the proximity of the inlet than in the proximity of the outlet.

It is known to introduce the lighter medium into the heavier medium in such cases in a directional manner. The current of the lighter medium is then introduced in the direction of flow of the heavier medium. The invention also permits such a measure. Thus, for example, starting from FIG. 8, it is possible to provide on the side approached by the heavier medium, no, smaller, narrower, lower, or more widely spaced openings 16 than on the opposite wall. The wall approached by the heavier medium may also have no extensions 17, 18 at all, so that the pressure drop will be greater there during the passage of the lighter medium, and a directional introduction in the above described sense will likewise be effected.

Another measure for realizing directional introduction is shown in FIG. 9. There a shutter member 6" is provided inside the body already described in FIG. 8, which is mounted for rotation about the axis 21. Instead of this one shutter member, there also can be used two rotatable shutter members which open in opposite direction. If these two shutter members have different lengths, or if the fulcrum of both shutter members is arranged with different eccentricity, a directional introduction of the lighter medium into the heavier medium thus is achieved. The rotatably mounted shutter members can also be arranged additionally on a vertically moving shutter member with apertures.

For situations where a special finely regulating action of the device is desired,—which regulation is achieved by reducing the swinging of the shutter member inside the holding device, it is suggested according to FIG. 10 to hold the shutter members by a central guide pin. The device then corresponds substantially to the arrangements already shown in FIG. 2. The holding device is mounted loosely for movement in the bottom aperture 5 of the intermediate tray 4. The holding device itself consists of the guide pieces 27 with the end stops 28, 11 and 29. The end stop 28 can have openings 10' therein. In the center of the end stop 28, a pin 22 is secured with the end stop 23 which pin guides and limits the shutter member 6. In the case, also, the above-described measure of varying the weights of the shutter members and holding devices can be applied.

I claim:

1. Intermediate tray for a material exchange column through which a heavier medium and a lighter medium are passed in separate directions said tray having a bottom plate with at least one bottom opening therein, which comprises
   a shutter member covering said bottom aperture;
   a holding device in which said shutter member is disposed and has limited vertical movement;
   upper and lower stop means on said holding device which stop means determine the extent of upward and downward movement of said shutter member with respect to said holding device for passing larger or smaller currents of such lighter medium upwardly through said aperture;
   a plurality of guide pieces in said bottom aperture in which said holding device is guided and has limited vertical movement;
   said guide pieces including upper and lower stop members limiting vertical movements of said holding device with respect to said aperture; and
   openings in said holding device accommodating outward transit of such lighter medium from said holding device.

2. Intermediate tray as defined in claim 1, in which the shutter member is smaller than the bottom aperture covered by it.

3. Intermediate tray as defined in claim 1, in which said shutter members has a hydrodynamic, that is, dome-shaped form, while the hollow side faces the approach flow direction of such lighter medium or is arranged remote to it or has a concave-convex form, while its center protrudes into said bottom aperture.

4. Intermediate tray as defined in claim 1, in which the holding device consists of a body substantially similar to the form of and which protrudes beyond the bottom aperture and which has current-guiding extensions such as scallops, lips, and the like, the guide pieces being molded with the limiting pieces on the end stop and the limiting pieces for limiting the bottom position being secured or molded on the body or being extensions secured or molded on the guide pieces.

5. Intermediate tray as defined in claim 1 in which the limiting pieces and/or guide pieces are connected together by means of a ring to which they are fixed or on which they are molded.

6. Intermediate tray as defined in claim 1, in which said shutter members are guided by a central guide pin provided with stops.

7. Intermediate tray as defined in claim 1, in which said shutter members and/or holding devices have different weights and in which all parts are produced by molding from metal and/or plastic.

8. Intermediate tray as defined in claim 1, in which the holding device has more than two guide pieces, and in which openings formed between the guide pieces are provided with extensions which are arranged parallel to the direction of flow of such lighter medium passing through said openings on its inlet or outlet side.

9. Intermediate tray as defined in claim 8, in which tongues are cut out which are bent into a form perpendicular to the flow cross section and parallel to the direction of flow of such lighter medium.

10. Intermediate tray as defined in claim 8, in which the wall in which the openings are provided is folded, and in which the openings are arranged either in the bottom or top fold.

11. Intermediate tray as defined in claim 8, in which said extensions have different lengths.

12. Intermediate tray as defined in claim 8, in which said extensions are sleeves inserted into the openings and cut off obliquely.

13. Intermediate tray as defined in claim 8, in which certain which are underneath the shutter member face to the inside, that is, the bottom aperture traversed by such lighter medium, and in which certain other extensions face the outside, that is, are arranged in the opposite direction.

14. Intermediate tray as defined in claim 8, in which said extensions form an angle with the main direction of flow of such lighter medium.

* * * * *

FO-1050
(5/69)

UNITED STATES PATENT OFFICE
CERTIFICATE OF CORRECTION

Patent No. 3,618,913      Dated November 9, 1971

Inventor(s) ARNO SCHRAMM

It is certified that error appears in the above-identified patent and that said Letters Patent are hereby corrected as shown below:

Claim 13, line 1, after the word "certain" the word --- extensions --- should appear.

Signed and sealed this 18th day of April 1972.

(SEAL)
Attest:

EDWARD M. FLETCHER, JR.      ROBERT GOTTSCHALK
Attesting Officer      Commissioner of Patents